US012360485B2

(12) United States Patent
Hirata

(10) Patent No.: US 12,360,485 B2
(45) Date of Patent: Jul. 15, 2025

(54) IMAGE FORMING SYSTEM AND CHARGE ELIMINATING APPARATUS

(71) Applicant: CANON KABUSHIKI KAISHA, Tokyo (JP)

(72) Inventor: Hiroki Hirata, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/436,776

(22) Filed: Feb. 8, 2024

(65) Prior Publication Data

US 2024/0280934 A1 Aug. 22, 2024

(30) Foreign Application Priority Data

Feb. 22, 2023 (JP) ................................ 2023-025655
Dec. 12, 2023 (JP) ................................ 2023-209664

(51) Int. Cl.
*G03G 15/00* (2006.01)

(52) U.S. Cl.
CPC ..... *G03G 15/6573* (2013.01); *G03G 15/6552* (2013.01)

(58) Field of Classification Search
CPC ...................... G03G 15/6573; G03G 15/6552
See application file for complete search history.

(56) References Cited

U.S. PATENT DOCUMENTS

| | | | | |
|---|---|---|---|---|
| 2012/0045265 A1* | 2/2012 | Zaretsky | G03G 15/6573 | 399/405 |
| 2014/0015189 A1* | 1/2014 | Minamisawa | B65H 43/02 | 271/3.18 |
| 2018/0084135 A1* | 3/2018 | Kasuga | G03G 15/22 | |
| 2022/0324672 A1* | 10/2022 | Hamabata | G03G 15/6582 | |

FOREIGN PATENT DOCUMENTS

| | | |
|---|---|---|
| JP | 2022161568 A | 10/2022 |
| JP | 2022171206 A | 11/2022 |

* cited by examiner

*Primary Examiner* — Jessica L Eley
(74) *Attorney, Agent, or Firm* — Canon U.S.A., Inc. IP Division

(57) ABSTRACT

An image forming system includes an image forming apparatus, an insertion apparatus to insert an insertion sheet among plural sheets, and a charge eliminating apparatus having a charge eliminating unit. The insertion apparatus includes a first conveyance path through which a sheet discharged from the image forming apparatus is conveyed to the charge eliminating apparatus, a feeding tray on which the insertion sheet is stacked, and a second conveyance path through which the insertion sheet fed from the feeding tray is conveyed to the charge eliminating apparatus. In the charge eliminating apparatus, the charge eliminating unit performs charge elimination processing on the sheet discharged from the image forming apparatus and conveyed to the charge eliminating apparatus through the first conveyance path, but does not perform the charge elimination processing on the insertion sheet fed from the feeding tray and conveyed to the charge eliminating apparatus through the second conveyance path.

9 Claims, 9 Drawing Sheets

IMAGE FORMING SYSTEM AND CHARGE ELIMINATING APPARATUS

BACKGROUND

Field

The present disclosure relates to an image forming system forming images on sheets, and to a charge eliminating apparatus.

Description of the Related Art

In conventional image forming apparatuses, such as a copier, sheets on which images are formed by an image forming unit are stacked on a discharge tray. In such an image forming apparatus, sheets stacked on the discharge tray can adhere to each other due to the electrostatic force between the sheets. To address this issue, an image forming system including a charge eliminating apparatus for removing electric charges from the sheets has been discussed. An image forming system discussed in Japanese Patent Application Laid-Open No. 2022-161568 includes a charge eliminating apparatus downstream (post-stage) of an image forming apparatus. The charge eliminating apparatus performs charge elimination on a sheet conveyed from the image forming apparatus, preventing adhesion of sheets on the discharge tray. Further, there is known a charge adjustment apparatus that applies a voltage to every other conveyed sheet such that facing surfaces of the sheets are electrified with the same polarity when the sheets are stacked, eliminating a stacking failure (see Japanese Patent Application Laid-Open No. 2022-171206).

Some of the image forming systems each include an insertion apparatus that inserts an insertion sheet between sheets on which images are formed. The insertion sheets fed from the insertion apparatus are sheets previously prepared by users. When charge elimination processing similar to the charge elimination processing performed on sheets conveyed from an image forming apparatus to a charge eliminating apparatus is performed on insertion sheets fed from an insertion apparatus, some insertion sheets can be unintentionally electrified, which causes a stacking failure. Likewise, when charge adjustment processing similar to the charge adjustment processing performed on sheets conveyed from an image forming apparatus to a charge adjustment apparatus is performed on the insertion sheets fed from an insertion apparatus by the charge adjustment apparatus, some insertion sheets can be unintentionally electrified, which causes a stacking failure.

SUMMARY

The present disclosure is directed to a technique for preventing a sheet stacking failure of discharged sheets in a case where an insertion sheet is fed from an insertion apparatus.

According to an aspect of the present disclosure, an image forming system includes an image forming apparatus configured to form an image on a sheet, an insertion apparatus disposed downstream of the image forming apparatus, and configured to insert an insertion sheet among a plurality of sheets on each of which an image is formed by the image forming apparatus, and a charge eliminating apparatus disposed downstream of the insertion apparatus, and including a charge eliminating unit configured to perform charge elimination on the sheet on which the image is formed by the image forming apparatus, wherein the insertion apparatus includes a first conveyance path through which the sheet discharged from the image forming apparatus is conveyed to the charge eliminating apparatus, a feeding tray on which the insertion sheet is stacked, and a second conveyance path through which the insertion sheet fed from the feeding tray is conveyed to the charge eliminating apparatus, and wherein, in the charge eliminating apparatus, the charge eliminating unit performs charge elimination processing on the sheet discharged from the image forming apparatus and conveyed to the charge eliminating apparatus through the first conveyance path, but does not perform the charge elimination processing on the insertion sheet fed from the feeding tray and conveyed to the charge eliminating apparatus through the second conveyance path.

Further features of the present disclosure will become apparent from the following description of exemplary embodiments with reference to the attached drawings.

DESCRIPTION OF THE EMBODIMENTS

Some exemplary embodiments of the present disclosure are described below with reference to drawings. Dimensions, materials, shapes, relative arrangement, and the like of components described in the following exemplary embodiments are not intended to limit the application scope of the present technique unless otherwise specified.

<Image Forming System>

Figure 1:
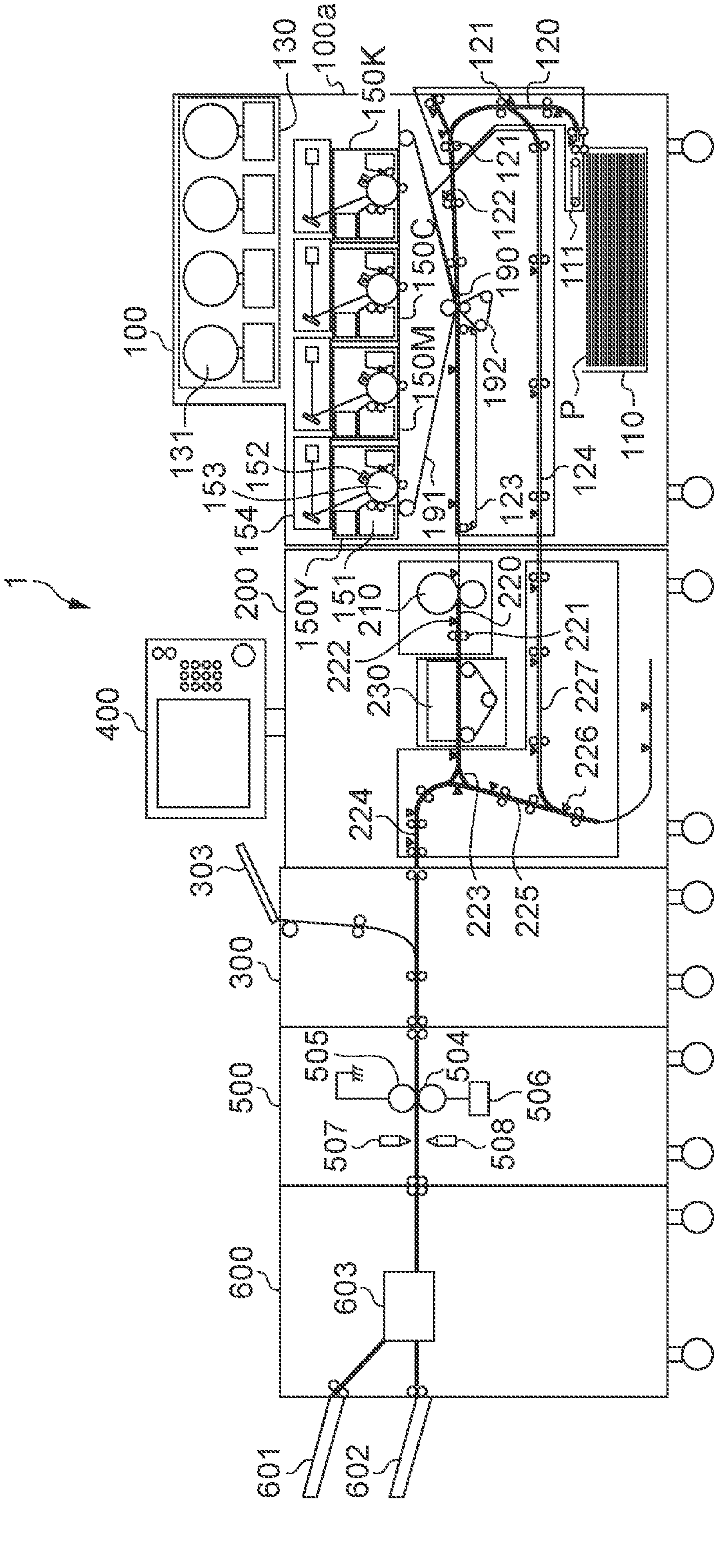
FIG. 1 is a cross-sectional view of an image forming system.

An image forming system 1 according to a first exemplary embodiment will be described. FIG. 1 is a cross-sectional view illustrating a configuration of the image forming system 1. The image forming system 1 includes an image forming apparatus 100, an inserter 300, an operation unit 400, a charge eliminating apparatus 500, and a finisher 600. The image forming apparatus 100 includes an image forming apparatus main body 100*a* and a fixing apparatus 200, and forms images on sheets. The inserter 300 connected downstream of the image forming apparatus 100 inserts insertion sheets between sheets on which images are formed by the image forming apparatus 100. The charge eliminating apparatus 500 connected downstream of the inserter 300 performs charge elimination on sheets conveyed from the inserter 300. The finisher 600 connected downstream of the charge eliminating apparatus 500 performs predetermined post-processing on sheets conveyed from the charge eliminating apparatus 500. The operation unit 400 for users to perform various kinds of operation on the image forming system 1 is provided above the fixing apparatus 200 of the image forming apparatus 100.

In the image forming system 1 according to the present exemplary embodiment, the image forming apparatus 100 and the inserter 300 are directly connected to each other; however, the configuration of the image forming system 1 is not limited thereto. For example, an intermediate apparatus that conveys sheets from the image forming apparatus 100 to the inserter 300 may be disposed between the image forming apparatus 100 and the inserter 300. In such a case, all apparatuses disposed upstream of the inserter 300 are collectively regarded as the image forming apparatus according to the present exemplary embodiment.

In the image forming system 1 according to the present exemplary embodiment, the inserter 300 and the charge eliminating apparatus 500 are directly connected to each other; however, the configuration of the image forming system 1 is not limited thereto. For example, an intermediate apparatus that conveys sheets from the inserter 300 to the charge eliminating apparatus 500 may be disposed between the inserter 300 and the charge eliminating apparatus 500.

<Image Forming Apparatus>

The image forming apparatus 100 will now be described. The image forming apparatus 100 according to the present exemplary embodiment is a tandem multifunctional peripheral using an intermediate transfer method. The image forming apparatus 100 can form a full-color image on a sheet P, such as paper (transfer medium, sheet medium, recording medium, and media) by using an electrophotographic method, for example, based on an image signal transmitted from an external apparatus (not illustrated).

The image forming apparatus main body 100*a* of the image forming apparatus 100 includes a cassette 110 housing the sheet P, and a feeding unit 111 that feeds the sheet P housed in the cassette 110.

The sheet P housed in the cassette 110 is separated one by one by the feeding unit 111 and fed to a conveyance path 120. A plurality of conveyance rollers 121 is disposed on the conveyance path 120. The sheet P fed from the feeding unit 111 is conveyed to a transfer portion 190 by the plurality of conveyance rollers 121. A path sensor 122 for determining a timing when the sheet P is conveyed is also disposed on the conveyance path 120.

The image forming apparatus main body 100*a* includes four image forming units 150Y, 150M, 150C, and 150K as a plurality of image forming units (stations). The image forming unit 150Y forms an image of yellow (Y), the image forming unit 150M forms an image of magenta (M), the image forming unit 150C forms an image of cyan (C), and the image forming unit 150K forms an image of black (K). The four image forming units 150Y, 150M, 150C, and 150K are arranged in a line in the direction of movement of the image transfer surface of an intermediate transfer belt 191.

The image forming unit 150Y includes a development unit 151, a primary charging unit 152, and a photosensitive drum 153. The photosensitive drum 153 as a photosensitive body that carries toner images is rotationally driven by driving force transferred from a drum driving motor (not illustrated). The surface of the rotating photosensitive drum 153 is uniformly charged to a predetermined potential of a predetermined polarity (negative polarity in present exemplary embodiment) by the primary charging unit 152. During the charging processing, a predetermined charging voltage is applied to the primary charging unit 152 by a charging power supply (not illustrated). A laser scanner 154 as an exposure unit irradiates the photosensitive drum 153 with laser beams modulated based on image information. The charged surface of the photosensitive drum 153 is scanned and exposed by the laser beams from the laser scanner 154 based on an image signal, forming an electrostatic latent image on the photosensitive drum 153. The electrostatic latent image formed on the photosensitive drum 153 is developed by the development unit 151, forming a toner image on the photosensitive drum 153. In the present exemplary embodiment, toner charged to the same polarity as the charged polarity of the photosensitive drum 153 adheres to the exposed portions on the photosensitive drum 153 the exposed portions of which the absolute values are reduced due to the exposure after being uniformly charged. The development unit 151 includes a development roller that carries the toner to a development position as a portion facing the photosensitive drum 153. During development, a predetermined development voltage is applied to the development roller by a development power supply (not illustrated). The toner is supplied to the development unit 151 from a toner bottle 131 inserted into a toner bottle unit 130, through a toner pipe (not illustrated).

The toner image visualized on the photosensitive drum 153 is transferred (primarily transferred) to the intermediate transfer belt 191 by a primary transfer roller to which a voltage of the polarity opposite to the charged polarity of the toner is applied.

The four image forming units 150Y, 150M, 150C, and 150K have a similar configuration except for the color of toner forming an image. Thus, a description of the image forming units 150M, 150C, and 150K is omitted. During color image formation, the toner images of the colors of yellow, magenta, cyan, and black are sequentially transferred to the intermediate transfer belt 191 by the image forming units 150Y, 150M, 150C, and 150K, so as to be superimposed on one another.

In the transfer portion 190, a transfer belt 192 is disposed at a position facing the intermediate transfer belt 191. The transfer belt 192 is pressed against the intermediate transfer belt 191 to form a secondary transfer nip. The toner images formed on the intermediate transfer belt 191 in the above-described manner are secondarily transferred to the sheet P conveyed through the conveyance path 120 at the secondary transfer nip of the transfer portion 190. In the secondary transfer, a secondary transfer voltage that is a direct-current voltage controlled to be constant with the polarity (positive polarity in present exemplary embodiment) opposite to the charged polarity of the toner is applied to the transfer belt 192 by a secondary transfer power supply (not illustrated). The sheet P on which the secondary transfer is complete is conveyed to the fixing apparatus 200 by a conveyance belt 123.

The fixing apparatus 200 includes a fuser 210 and a cooler 230. The fuser 210 heats and pressurizes the sheet P carrying the unfixed toner images, fixing (fusing and sticking) the toner images onto the surface of the sheet P. The sheet P on which the toner images are fixed is conveyed to the cooler 230 by conveyance rollers 221 disposed on the conveyance path 220. A sensor 222 that detects sheets is disposed on the conveyance path 220, and the cooler 230 is controlled based on signals from the sensor 222. The cooler 230 has a function of cooling the sheet P heated by the fuser 210.

To perform face-up printing in which the sheet P is discharged to the outside of the apparatus with a printed image surface faced upward, the sheet P cooled by the cooler 230 is conveyed to a conveyance path 224 via a switching unit 223. In contrast, to perform face-down printing in which the sheet is discharged to the outside of the apparatus with a printed image surface faced downward, the sheet P is conveyed to a reverse conveyance path 225 via the switching unit 223. The sheet P is reversed into the reverse conveyance path 225, and is then conveyed to the conveyance path 224. The sheet P conveyed to the conveyance path 224 in the above-described manner is discharged from the image forming apparatus 100 and is then conveyed to the inserter 300.

To perform double-sided printing, the sheet P on which printing on a first surface (front surface) is complete is conveyed from the reverse conveyance path 225 to a double-sided conveyance path 227 via a switching unit 226. The sheet P conveyed to the double-sided conveyance path 227 is conveyed to the transfer portion 190 again through a conveyance path 124 and the conveyance path 120 of the image forming apparatus main body 100*a*. An image is formed on a second surface (rear surface) of the sheet P conveyed to the transfer portion 190 in a manner similar to the first surface. The sheet P on which printing on the second surface is complete is discharged from the image forming apparatus 100 through the conveyance path 224, and is conveyed to the inserter 300.

In the present exemplary embodiment, the image forming apparatus 100 includes the image forming apparatus main body 100*a* and the fixing apparatus 200; however, the fixing apparatus 200 may be integrally disposed inside the housing of the image forming apparatus main body 100*a*.

<Inserter>

Figure 2:
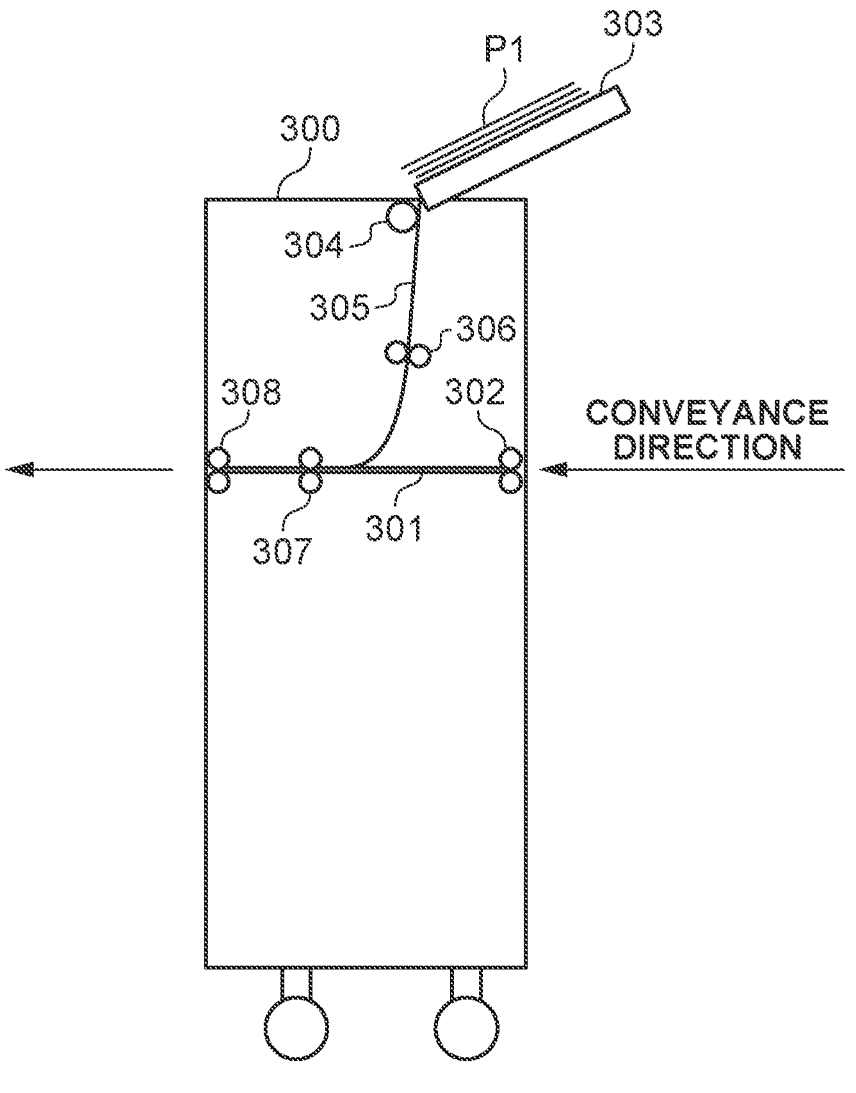
FIG. 2 is a cross-sectional view of an inserter.

A configuration of the inserter 300 will now be described. FIG. 2 is a cross-sectional view of the inserter 300. The inserter 300 is disposed downstream (post-stage) of the image forming apparatus 100. The inserter 300 includes a through path 301 as a first conveyance path through which the sheet P discharged from the image forming apparatus 100 is conveyed. Inlet rollers 302 and outlet rollers 308 are disposed on the through path 301. The inlet rollers 302 receive the sheet P from the image forming apparatus 100, and convey the sheet P along the through path 301. The outlet rollers 308 discharge the sheet P from the inserter 300. The sheet P discharged from the inserter 300 is conveyed to the charge eliminating apparatus 500 disposed downstream of the inserter 300.

The inserter 300 includes a feeding tray 303 on which an insertion sheet P1 is stacked, and a feeding roller 304 that feeds the insertion sheet P1 stacked on the feeding tray 303. The inserter 300 further includes an insertion conveyance path 305 as a second conveyance path through which the insertion sheet P1 fed from the feeding tray 303 is conveyed. The insertion conveyance path 305 is merged into the through path 301 at a merging portion 307. Conveyance rollers 306 are disposed on the insertion conveyance path 305. The insertion sheet P1 fed by the feeding roller 304 is conveyed to the merging portion 307 by the conveyance rollers 306. The insertion sheet P1 passes through the merging portion 307, and is then discharged from the inserter 300 by the outlet rollers 308. The insertion sheet P1 discharged from the inserter 300 is conveyed to the charge eliminating apparatus 500 disposed downstream of the inserter 300.

The user can set the type of the insertion sheet P1 stacked on the feeding tray 303 of the inserter 300 by using the operation unit 400. The operation unit 400 is an example of an acquisition unit that acquires the type of the insertion sheet P1 stacked on the feeding tray 303. Examples of the type of the insertion sheet P1 include plain paper, a sheet (synthetic paper) manufactured using a synthetic resin as a main material, and special paper (vapor-deposition paper) obtained by vacuum-depositing a metal layer on a surface.

<Charge Eliminating Apparatus>

Figure 3:
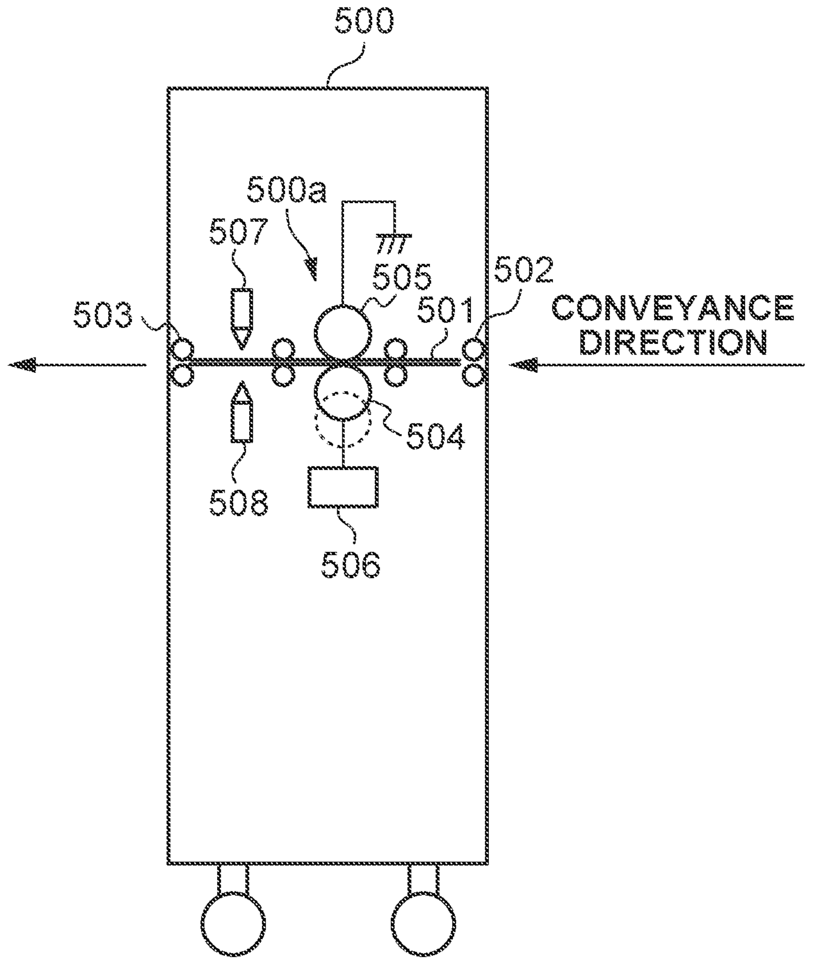
FIG. 3 is a cross-sectional view of a charge eliminating apparatus.

A configuration of the charge eliminating apparatus 500 will be described. FIG. 3 is a cross-sectional view of the charge eliminating apparatus 500. The charge eliminating apparatus 500 is disposed downstream of the image forming apparatus 100 and the inserter 300. The charge eliminating apparatus 500 includes a conveyance path 501 through which the sheet (sheet P and insertion sheet P1) discharged from the inserter 300 is conveyed. Inlet rollers 502 and outlet rollers 503 are disposed on the conveyance path 501. The inlet rollers 502 receive the sheet from the inserter 300, and convey the sheet along the conveyance path 501. The outlet rollers 503 discharge the sheet from the charge eliminating apparatus 500. The sheet discharged from the charge eliminating apparatus 500 is conveyed to the finisher 600 disposed downstream of the charge eliminating apparatus 500.

The charge eliminating apparatus 500 includes a charge eliminating roller 504 and a charge eliminating counter roller 505. The charge eliminating roller 504 and the charge eliminating counter roller 505 constitute a charge eliminating roller pair 500*a* as a charge eliminating unit that performs charge elimination on the sheet while being in contact with the sheet. A charge eliminating voltage that is a direct-current voltage controlled to be constant with the polarity (negative polarity in present exemplary embodiment) opposite to the polarity of the transfer belt 192 is applied to the charge eliminating roller 504 by a charge eliminating power supply 506. The charge eliminating counter roller 505 is electrically grounded (connected to the ground). The charge eliminating roller 504 can move between a contact position (position illustrated by solid line in FIG. 3) where the charge eliminating roller 504 is in contact with the charge eliminating counter roller 505, and a separation position (position illustrated by dashed line in FIG. 3) where the charge eliminating roller 504 is separated from the charge eliminating counter roller 505, by a moving mechanism (not illustrated). When a sheet not requiring charge eliminating is conveyed, the charge eliminating roller 504 is moved to the separation position. The charge eliminating apparatus 500 may not include the moving mechanism that moves the charge eliminating roller 504 to the contact position and the separation position. In other words, the charge eliminating roller 504 may be constantly in contact with the charge eliminating counter roller 505.

Two ionizers 507 and 508 are disposed downstream of the charge eliminating roller 504.

The ionizer 507 is disposed above the conveyance path 501, and the ionizer 508 is disposed below the conveyance path 501. The ionizers 507 and 508 as non-contact charge eliminating units perform charge elimination on the sheet in a non-contact state with the conveyed sheet. The ionizers 507 and 508 perform charge elimination on the sheet conveyed through the conveyance path 501 by emitting ions to the sheet. The non-contact charge eliminating units are not limited to the ionizers, and for example, a corotron including a discharge wire may be used.

The charge eliminating roller pair 500*a* directly applies a voltage while being in contact with the sheet, providing a great effect of charge eliminating by the charge eliminating roller pair 500*a* according to the present exemplary embodiment. In contrast, the charge eliminating roller pair 500*a* has a characteristic of wide variation of surface potentials of the sheet with the charges removed, which is likely to result in nonuniform charge eliminating. The sheet charge eliminating effect provided by the ionizers 507 and 508 is smaller than the charge eliminating effect by the charge eliminating roller pair 500*a*; however, the variation of surface potentials of the sheet with the charges removed is small. Thus, the ionizers 507 and 508 can reduce the variation of the surface potentials of the sheet, the variation of which is generated by the charge eliminating roller pair 500*a*.

<Finisher>

The finisher 600 will now be described with reference to FIG. 1. The finisher 600 is disposed downstream of the image forming apparatus 100, the inserter 300, and the charge eliminating apparatus 500. The finisher 600 discharges the sheet (sheet P and insertion sheet P1) discharged from the charge eliminating apparatus 500 to the outside of the image forming system 1. The finisher 600 includes discharge trays 601 and 602 on which sheets discharged from the finisher 600 are stacked. The finisher 600 further includes a post-processing unit 603 that performs predetermined post-processing on sheets. The post-processing unit 603 has, for example, a sheet folding function, a sheet cutting function, a bookbinding function, a sheet binding function, and a sheet punching function. The sheets subjected to the predetermined post-processing by the post-processing unit 603 is discharged to the discharge tray 601 or 602.

<Control Configuration of Image Forming System>

Figure 4:
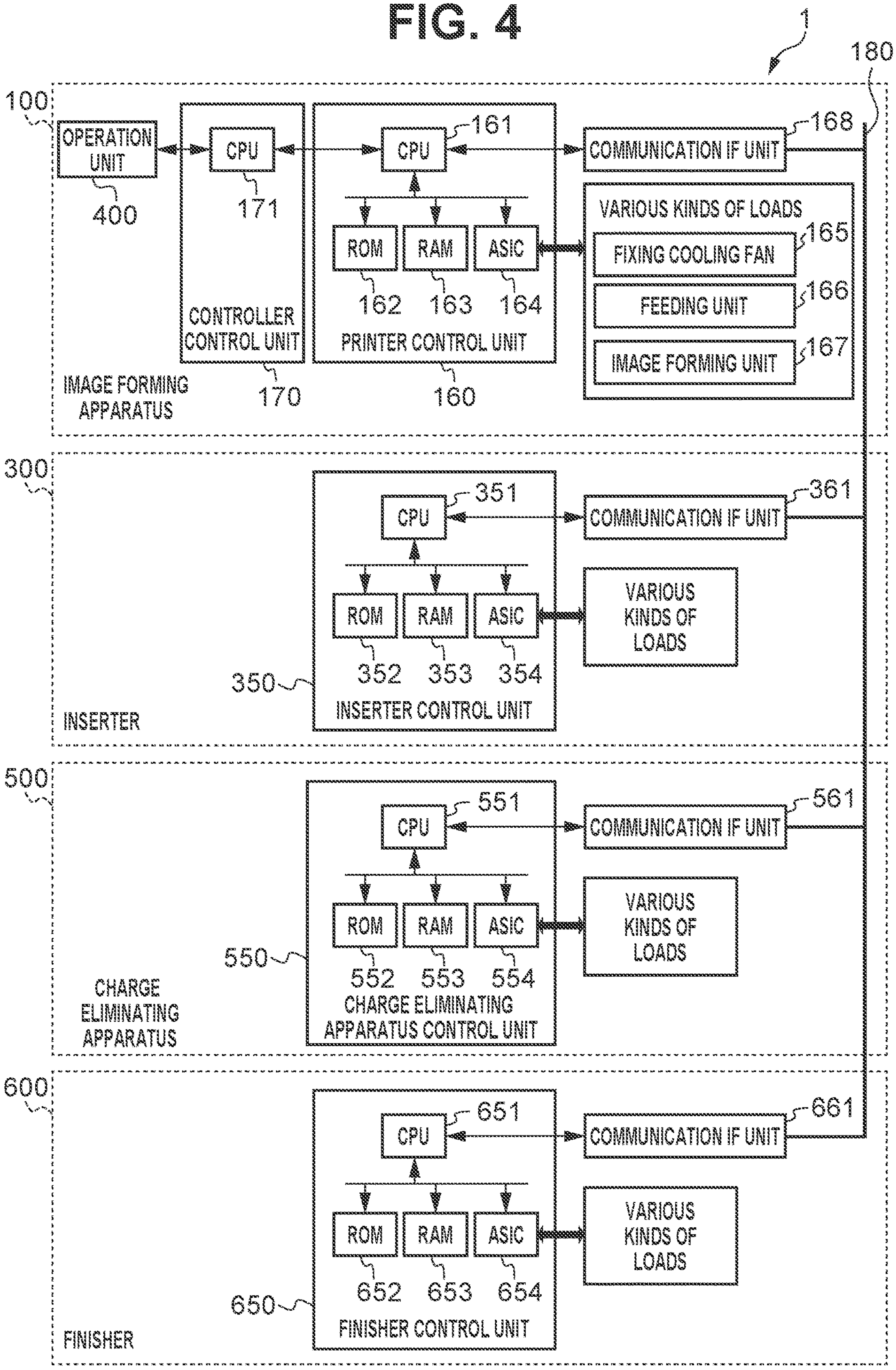
FIG. 4 is a block diagram illustrating control units of the image forming system.

FIG. 4 is a block diagram of control units of the image forming system 1. The image forming apparatus 100 includes a printer control unit 160. The printer control unit 160 includes a central processing unit (CPU) 161, a read-only memory (ROM) 162, a random-access memory (RAM) 163, and an application specific integrated circuit (ASIC) 164. The CPU 161 performs commands based on control programs stored in the ROM 162. The ASIC 164 is connected to various kinds of loads, such as an image forming unit 167, a feeding unit 166, and a fixing cooling fan 165, and performs controls in response to commands from the CPU 161. The CPU 161 communicates with a CPU 171 of a controller control unit 170 that controls the operation unit 400, and controls the image forming apparatus 100 based on information input to the operation unit 400. The operation unit 400 includes a display unit that displays information.

The image forming apparatus 100 includes a communication interface unit (communication IF unit) 168 for communicating with the inserter 300, the charge eliminating apparatus 500, and the finisher 600 connected downstream of the image forming apparatus 100. The CPU 161 is connected to a communication line 180 through the communication IF unit 168. The communication line 180 is connected to the inserter 300, the charge eliminating apparatus 500, and the finisher 600. The communication line 180 includes a serial signal line, and a parallel signal line including a power supply remote signal line. Transmission/reception of information between the apparatuses is performed using serial data through the serial signal line. The CPU 161 transmits power supply remote signals through the power supply remote signal line, to start up the power supply of each of the inserter 300, the charge eliminating apparatus 500, and the finisher 600 connected downstream of the image forming apparatus 100.

The inserter 300 includes an inserter control unit 350. The inserter control unit 350 includes a CPU 351, a ROM 352, a RAM 353, and an ASIC 354. The CPU 351 performs commands based on a control program stored in the ROM 352. The ASIC 354 is connected to various kinds of loads, such as an inserter feeding unit and a sheet conveyance unit, and performs controls in response to commands from the CPU 351. The CPU 351 communicates with the image forming apparatus 100, the charge eliminating apparatus 500, and the finisher 600 through a communication IF unit 361.

The charge eliminating apparatus 500 includes a charge eliminating apparatus control unit 550. The charge eliminating apparatus control unit 550 includes a CPU 551, a ROM 552, a RAM 553, and an ASIC 554. The CPU 551 performs commands based on control programs stored in the ROM 552. The ASIC 554 is connected to various kinds of loads, such as a sheet conveyance unit and a sensor, and performs controls in response to commands from the CPU 551. The CPU 551 communicates with the image forming apparatus 100, the inserter 300, and the finisher 600 through a communication IF unit 561.

The finisher 600 includes a finisher control unit 650. The finisher control unit 650 includes a CPU 651, a ROM 652, a RAM 653, and an ASIC 654. The CPU 651 performs commands based on control programs stored in the ROM 652. The ASIC 654 is connected to various kinds of loads, such as a post-processing unit and a sheet conveyance unit, and performs controls in response to commands from the CPU 651. The CPU 651 communicates with the image forming apparatus 100, the inserter 300, and the charge eliminating apparatus 500 through a communication IF unit 661.

<Control of Charge Eliminating Operation>

When the image forming apparatus 100 forms an image on the sheet P, the sheet P is charged in some cases. Charged characteristics depend on the type of a sheet. Synthetic paper and vapor-deposition paper have large electric resistances and are easily charged. If the sheet P is discharged to the discharge tray 601 or 602 while being charged, a plurality of sheets P may attract each other by the electrostatic force, can cause adhesion of the sheets. Thus, in the image forming system 1 according to the present exemplary embodiment, the charge eliminating apparatus 500 performs charge elimination on the sheet P based on the type of the sheet. More specifically, if the sheet P subjected to image formation by the image forming apparatus 100 and conveyed to the charge eliminating apparatus 500 is of a paper type easily being charged (e.g., synthetic paper or vapor-deposition paper), the sheet P is performed charge elimination by both the charge eliminating roller pair 500*a* as the charge eliminating unit and the ionizers 507 and 508 as the non-contact charge eliminating units. In contrast, plain paper can be sufficiently neutralized only by the ionizers 507 and 508 as the non-contact charge eliminating units since plain paper has lower electric resistance than those of synthetic paper and vapor-deposition paper. In other words, the sheet P, such as plain paper, is not performed charge elimination by the charge eliminating roller pair 500*a* as the charge eliminating unit. More specifically, if the sheet P subjected to image formation by the image forming apparatus 100 and conveyed to the charge eliminating apparatus 500 is of a first type (e.g., synthetic paper or vapor-deposition paper), in the charge eliminating apparatus 500, the charge eliminating roller pair 500*a* performs the charge elimination processing on the sheet P. In contrast, if the sheet P subjected to image formation by the image forming apparatus 100 and conveyed to the charge eliminating apparatus 500 is of a second type (e.g., plain paper), in the charge eliminating apparatus 500, the charge eliminating roller pair 500*a* does not perform the charge elimination processing on the sheet P.

The insertion sheet P1 fed from the feeding tray 303 of the inserter 300 is often conveyed to the charge eliminating apparatus 500 in a non-charged state. In other words, the insertion sheet P1 fed from the feeding tray 303 of the inserter 300 is not subjected to the secondary transfer process of the image formation. Thus, even if the insertion sheet P1 is of a type being easily charged, for example, synthetic paper, the insertion sheet P1 is not charged in most cases. In such a case, when charge elimination processing similar to the charge elimination processing for the sheet P on which an image is formed by the image forming apparatus 100 is performed on the insertion sheet P1, the insertion sheet P1 may be unintentionally charged, can cause adhesion of sheets. Thus, in the present exemplary embodiment, in the charge eliminating apparatus 500, the charge eliminating roller pair 500*a* does not perform the charge elimination processing on the insertion sheet P1 irrespective of the type of the insertion sheet P1. In other words, in the charge eliminating apparatus 500, the charge eliminating roller pair 500*a* performs the charge eliminating on the sheet P subjected to image formation by the image forming apparatus 100 and conveyed to the charge eliminating apparatus 500 based on the type of the sheet P. In contrast, in the charge eliminating apparatus 500, the charge eliminating roller pair 500*a* does not perform the charge eliminating on the insertion sheet P1 fed from the feeding tray 303 of the inserter 300 irrespective of the type of the insertion sheet P1. For example, a case will be described where the sheet P on which an image is formed by the image forming apparatus 100 and the insertion sheet P1 conveyed from the inserter 300 are both synthetic paper. The sheet P of synthetic paper on which an image is formed by the image forming apparatus 100 is performed charge elimination by the charge eliminating roller pair 500*a*, whereas the insertion sheet P1 of synthetic paper fed from the feeding tray 303 of the inserter 300 is not performed charge elimination by the charge eliminating roller pair 500*a*.

Figure 5:
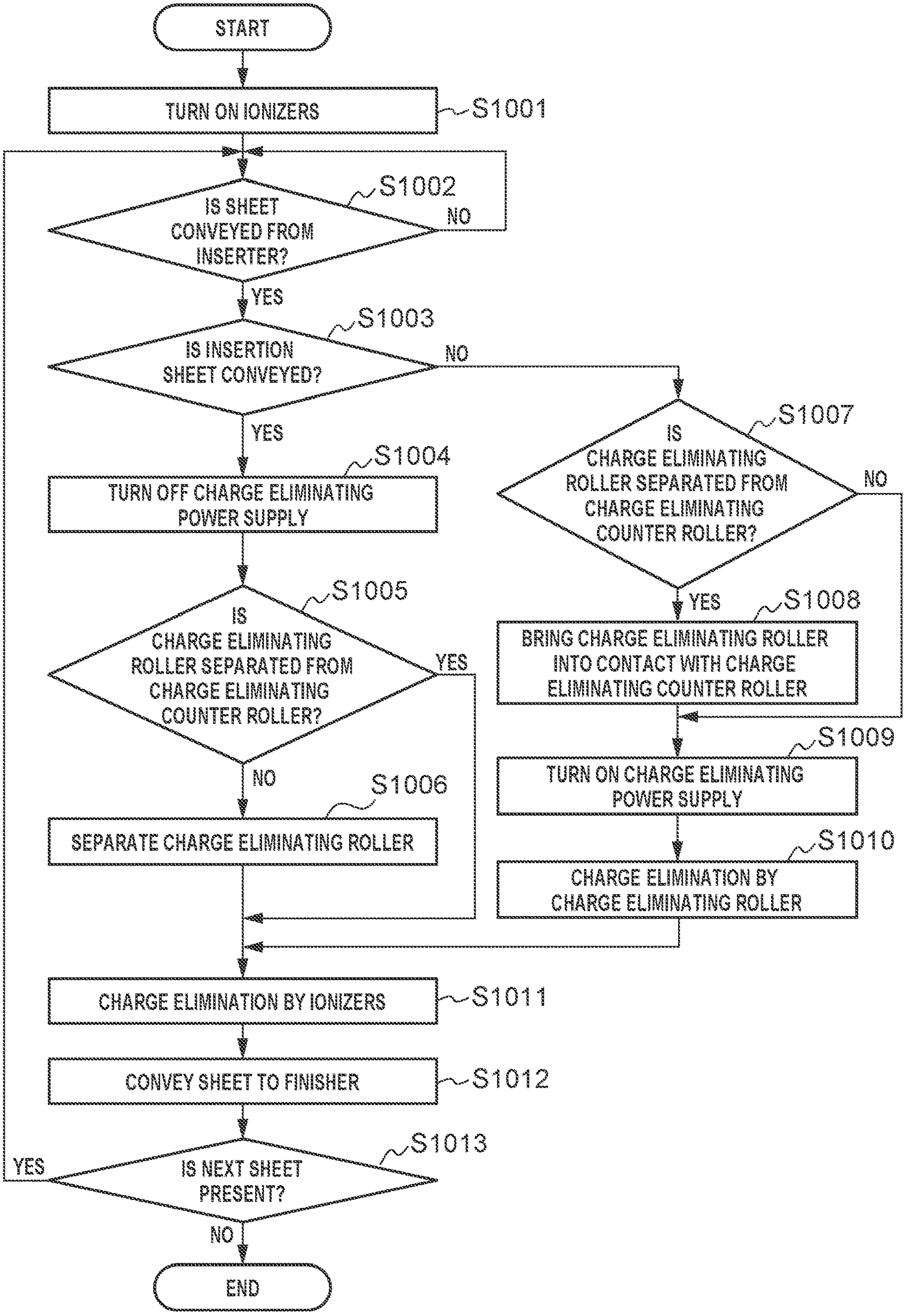
FIG. 5 is a flowchart illustrating charge eliminating operation according to a first exemplary embodiment.

In the following, control of charge eliminating operation performed by the charge eliminating apparatus 500 will be described in a case where the sheet P on which an image is formed by the image forming apparatus 100 is of a type requiring charge eliminating by the charge eliminating roller pair 500*a*. FIG. 5 is a flowchart illustrating charge eliminating operation processing performed by the charge eliminating apparatus 500. In the present exemplary embodiment, the CPU 551 of the charge eliminating apparatus 500 performs the following processing in the flowchart; however, for example, the CPU 161 of the image forming apparatus 100 or an external computer (not illustrated) may perform such processing.

When the image forming system 1 starts a print job in response to an instruction from the user, the CPU 551 of the charge eliminating apparatus 500 starts the processing in the flowchart of FIG. 5. In step S1001, the CPU 551 turns on the two ionizers 507 and 508. In step S1002, the CPU 551 stands by until a sheet is conveyed from the inserter 300 to the charge eliminating apparatus 500. When the sheet is conveyed (YES in step S1002), the processing proceeds to step S1003. In step S1003, the CPU 551 determines whether the sheet conveyed from the inserter 300 is the insertion sheet P1 fed from the feeding tray 303 of the inserter 300. If the sheet conveyed from the inserter 300 is the insertion sheet P1 (YES in step S1003), the processing proceeds to step S1004. In step S1004, the CPU 551 turns off voltage application to the charge eliminating roller 504 by the charge eliminating power supply 506. In step S1005, the CPU 551 determines whether the charge eliminating roller 504 is separated from the charge eliminating counter roller 505. If the charge eliminating roller 504 is not separated from the charge eliminating counter roller 505 (NO in step S1005), the processing proceeds to step S1006. In step S1006, the CPU 551 separates the charge eliminating roller 504 from the charge eliminating counter roller 505.

In step S1003, if the sheet conveyed from the inserter 300 is the sheet P on which an image is formed by the image forming apparatus 100 (NO in step S1003), the processing proceeds to step S1007. In step S1007, the CPU 551 determines whether the charge eliminating roller 504 is separated from the charge eliminating counter roller 505.

If the charge eliminating roller 504 is separated from the charge eliminating counter roller 505 (YES in step S1007), the processing proceeds to step S1008. In step S1008, the CPU 551 brings the charge eliminating roller 504 into contact with the charge eliminating counter roller 505. In step S1009, the CPU 551 turns on voltage application to the charge eliminating roller 504 by the charge eliminating power supply 506. In step S1010, the conveyed sheet P is performed charge elimination by the charge eliminating roller pair 500*a*.

In step S1011, the sheet performed charge elimination by the charge eliminating roller pair 500*a* is performed charge elimination by the ionizers 507 and 508. Even if the sheet conveyed from the inserter 300 is the insertion sheet P1, the CPU 551 causes the ionizers 507 and 508 to perform the charge eliminating processing in step S1011. Thereafter, in step S1012, the CPU 551 conveys the sheet to the finisher 600. In step S1013, the CPU 551 determines whether the next sheet is present. If the next sheet is present (YES in step S1013), the processing returns to step S1002. If the next sheet is absent (NO in step S1013), the processing in the flowchart is completed.

As described above, in the charge eliminating apparatus 500, the charge eliminating roller pair 500*a* performs the charge elimination processing on the sheet P on which an image is formed by the image forming apparatus 100. In other words, in the charge eliminating apparatus 500, the charge eliminating roller pair 500*a* performs the charge elimination processing on the sheet P discharged from the image forming apparatus 100 and conveyed to the charge eliminating apparatus 500 through the through path 301. In contrast, in the charge eliminating apparatus 500, the charge eliminating roller pair 500*a* does not perform the charge elimination processing on the insertion sheet P1 fed from the feeding tray 303 of the inserter 300. In other words, in the charge eliminating apparatus 500, the charge eliminating roller pair 500*a* does not perform the charge elimination processing on the insertion sheet P1 that is fed from the feeding tray 303 and conveyed to the charge eliminating apparatus 500 through the insertion conveyance path 305. This makes it possible to prevent the insertion sheet P1 from being unintentionally charged, and to reduce adhesion of sheets on the discharge trays 601 and 602 when the insertion sheet P1 is fed from the inserter 300.

As described above, the ionizers 507 and 508 can make the surface potentials of the sheet uniform. In addition, even if the charge elimination processing by the ionizers 507 and 508 is performed on the insertion sheet P1, the insertion sheet P1 is not charged. Thus, in the present exemplary embodiment, the charge elimination processing by the ionizers 507 and 508 is performed on both the sheet P on which an image is formed by the image forming apparatus 100 and the insertion sheet P1 fed from the feeding tray 303. This makes it possible to further reduce adhesion of the sheets on the discharge trays 601 and 602. However, the charge eliminating apparatus 500 may be controlled so that the ionizers 507 and 508 does not perform the charge elimination processing on the insertion sheet P1.

A second exemplary embodiment will be described. In the first exemplary embodiment, in the charge eliminating apparatus 500, the charge eliminating roller pair 500*a* does not perform the charge elimination processing on the insertion sheet P1. In contrast, in the second exemplary embodiment, the charge eliminating apparatus 500 can selectively perform a first mode in which the charge elimination processing by the charge eliminating roller pair 500*a* is not performed on the insertion sheet P1, or a second mode in which the charge elimination processing by the charge eliminating roller pair 500*a* is performed on the insertion sheet P1. A hardware configuration of the image forming system 1 according to the second exemplary embodiment is similar to the hardware configuration of the image forming system 1 according to the first exemplary embodiment. Thus, a description thereof will be omitted.

Figure 6:
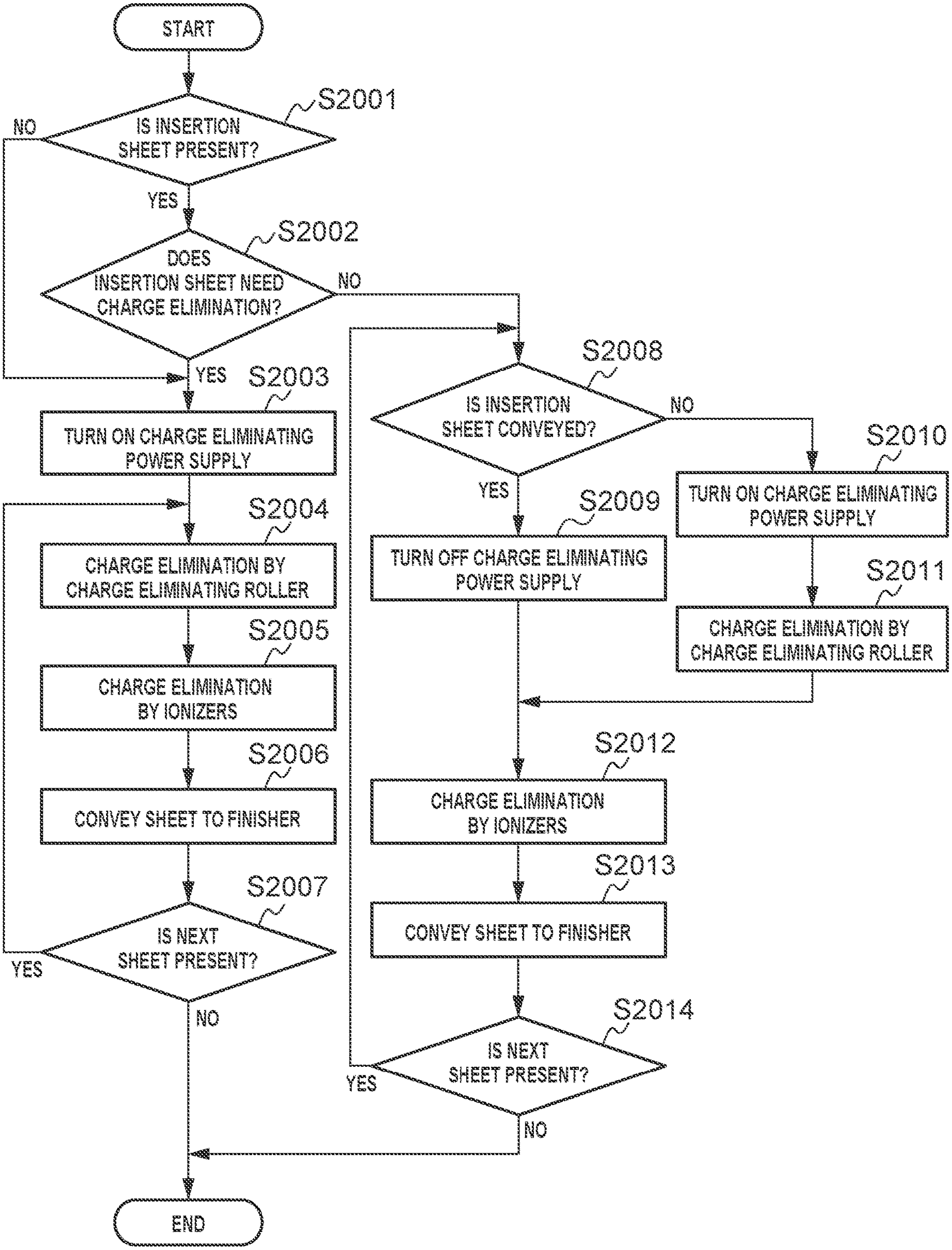
FIG. 6 is a flowchart illustrating charge eliminating operation according to a second exemplary embodiment.

FIG. 6 is a flowchart illustrating charge eliminating operation processing performed by the charge eliminating apparatus 500 in the second exemplary embodiment. When the image forming system 1 starts a print job in response to an instruction from the user, the CPU 551 of the charge eliminating apparatus 500 starts the processing in the flowchart of FIG. 6. In step S2001, the CPU 551 determines whether the insertion sheet P1 is present on the feeding tray 303. At this time, the CPU 551 determines presence/absence of the insertion sheet P1 by using a sheet detection sensor (not illustrated) provided on the feeding tray 303. If the insertion sheet P1 is present on the feeding tray 303 (YES in step S2001), the processing proceeds to step S2002. In step S2002, the CPU 551 determines whether the insertion sheet P1 is of a type requiring charge eliminating by the charge eliminating roller pair 500*a*. The operation unit 400 allows input of the type of the insertion sheet P1. Based on the type of the insertion sheet P1 acquired by the operation unit 400 as the acquisition unit, the CPU 551 determines whether the insertion sheet P1 is of a type requiring charge eliminating by the charge eliminating roller pair 500*a*. Examples of a first type requiring the charge elimination processing by the charge eliminating roller pair 500*a* include a sheet (synthetic paper) manufactured using a synthetic resin as a main material, and special paper (vapor-deposition paper) obtained by vacuum-depositing a metal layer on a surface of a sheet.

Synthetic paper and vapor-deposition paper have a characteristic of being easily electrified. Sheets of these types are desirably performed charge elimination by the charge eliminating roller pair 500*a* even though the sheet is the insertion sheet P1. In contrast, examples of a second type not requiring the charge elimination processing by the charge eliminating roller pair 500*a* include plain paper.

If the insertion sheet P1 is of a type requiring charge eliminating (YES in step S2002), the processing proceeds to step S2003. In step S2003, the CPU 551 turns on voltage application to the charge eliminating roller 504 by the charge eliminating power supply 506. In step S2004, the CPU 551 causes the charge eliminating roller pair 500*a* to perform charge elimination on the conveyed sheet. At this time, the charge elimination processing by the charge eliminating roller pair 500*a* is performed irrespective of whether the conveyed sheet is the insertion sheet P1. In step S2005, the CPU 551 causes the ionizers 507 and 508 to perform charge elimination on the sheet. In step S2006, the sheet with the charges removed is conveyed to the finisher 600. If the next sheet is present (YES in step S2007), the processing returns to step S2004. If the next sheet is absent (NO in step S2007), the processing in the flowchart is completed. The above-described processing in steps S2003 to S2007 is an example of the processing in the second mode.

In step S2002, if the insertion sheet P1 is of a type not requiring charge eliminating (NO in step S2002), the processing proceeds to step S2008. In step S2008, the CPU 551 determines whether the sheet conveyed from the inserter 300 is the insertion sheet P1 fed from the feeding tray 303 of the inserter 300. If the sheet conveyed from the inserter 300 is the insertion sheet P1 (YES in step S2008), the processing proceeds to step S2009. In step S2009, the CPU 551 turns off voltage application to the charge eliminating roller 504 by the charge eliminating power supply 506. In other words, if the conveyed sheet is the insertion sheet P1, the CPU 551 does not cause the charge eliminating roller pair 500*a* to perform the charge elimination processing.

In step S2008, if the sheet conveyed from the inserter 300 is the sheet P on which an image is formed by the image forming apparatus 100 (NO in step S2008), the processing proceeds to step S2010. In step S2010, the CPU 551 turns on voltage application to the charge eliminating roller 504 by the charge eliminating power supply 506. In step S2011, the CPU 551 causes the charge eliminating roller 504 and the charge eliminating counter roller 505 to perform charge elimination on the conveyed sheet. In other words, if the conveyed sheet is the sheet P on which an image is formed by the image forming apparatus 100, the CPU 551 causes the charge eliminating roller pair 500*a* to perform the charge elimination processing.

In step S2012, the CPU 551 causes the ionizers 507 and 508 to perform the charge elimination processing on the sheet. In step S2013, the CPU 551 conveys the sheet to the finisher 600.

Even if the sheet conveyed from the inserter 300 is the insertion sheet P1, the CPU 551 causes the ionizers 507 and 508 to perform the charge elimination processing. If the next sheet is present (YES in step S2014), the processing returns to step S2008. If the next sheet is absent (NO in step S2014), the processing in the flowchart is completed. The above-described processing in steps S2008 to S2014 is an example of the processing in the first mode.

As described above, in the second exemplary embodiment, the charge eliminating apparatus 500 determines whether to perform charge elimination on the insertion sheet P1 by the charge eliminating roller pair 500*a* based on the type of the insertion sheet P1 inserted from the inserter 300. If the insertion sheet P1 is of the first type (e.g., synthetic paper or vapor-deposition paper), in the charge eliminating apparatus 500, the charge eliminating roller pair 500*a* performs the charge elimination processing on both the sheet P on which an image is formed by the image forming apparatus 100 and the insertion sheet P1 fed from the feeding tray 303. As described above, the mode in which the charge elimination processing by the charge eliminating roller pair 500*a* is performed on both the sheet P on which an image is formed by the image forming apparatus 100 and the insertion sheet P1 fed from the feeding tray 303 is an example of the first mode. In contrast, if the insertion sheet P1 is of the second type (e.g., plain paper), the charge elimination processing by the charge eliminating roller pair 500*a* is not performed on the insertion sheet P1 fed from the feeding tray 303 as in the first exemplary embodiment. As described above, the mode in which the charge elimination processing by the charge eliminating roller pair 500*a* is performed on the sheet P on which an image is formed by the image forming apparatus 100 but the charge elimination processing by the charge eliminating roller pair 500*a* is not performed on the insertion sheet P1 is an example of the second mode.

As synthetic paper and vapor-deposition paper have a characteristic of being easily electrified, the sheet of these types may be charged even though the sheet is the insertion sheet P1. In the second exemplary embodiment, however, the charge eliminating apparatus 500 determines whether to perform charge elimination on the insertion sheet P1 based on the type of the insertion sheet P1. Thus, the charge eliminating apparatus 500 can properly perform charge elimination on the insertion sheet P1. In addition, if the insertion sheet P1 is of a type not requiring charge eliminating, the charge elimination processing by the charge eliminating roller pair 500*a* is not performed. Thus, as in the first exemplary embodiment, this makes it possible to reduce adhesion of sheets on the discharge trays 601 and 602.

A third exemplary embodiment will be described. In the above-described first exemplary embodiment, the charge elimination processing by the charge eliminating roller pair 500*a* is not performed on the insertion sheet P1 fed from the feeding tray 303 and conveyed to the charge eliminating apparatus 500 through the insertion conveyance path 305. However, in the charge eliminating apparatus 500, the charge eliminating roller pair 500*a* may perform the charge elimination processing on the insertion sheet P1 at a voltage at which the insertion sheet P1 is not charged. In such a case, in the charge eliminating apparatus 500, the charge eliminating roller pair 500*a* performs the charge elimination processing on the sheet P discharged from the image forming apparatus 100 and conveyed to the charge eliminating apparatus 500 through the through path 301, at a first voltage. In contrast, in the charge eliminating apparatus 500, the charge eliminating roller pair 500*a* performs the charge elimination processing on the insertion sheet P1 fed from the feeding tray 303 and conveyed to the charge eliminating apparatus 500 through the insertion conveyance path 305, at a second voltage lower than the first voltage. In the above-described manner, the insertion sheet P1 is performed charge elimination at a voltage lower than a voltage for the sheet P on which an image is formed, making it possible to reduce adhesion of sheets.

Figure 7:
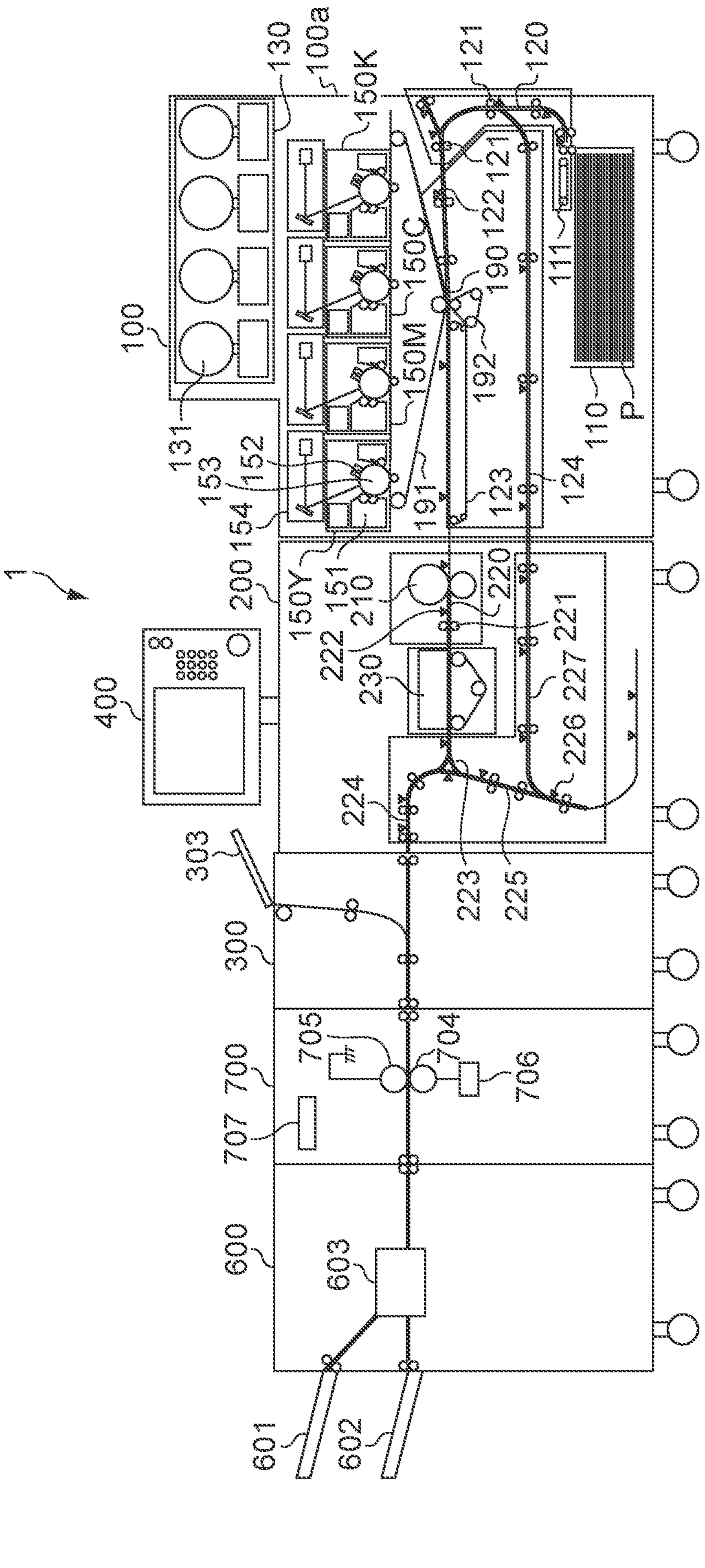
FIG. 7 is a cross-sectional view of an image forming system according to a fourth exemplary embodiment.

A fourth exemplary embodiment will be described. FIG. 7 illustrates an example of an image forming system. The image forming apparatus 100, the inserter 300, the operation unit 400, and the finisher 600 of the image forming system illustrated in FIG. 7 are similar to those of the image forming system illustrated in FIG. 1, and a description thereof will be omitted. The following is a description of a charge adjustment apparatus 700. The charge eliminating apparatus 500 illustrated in FIG. 1 includes the charge eliminating roller 504, the charge eliminating counter roller 505, and the ionizers 507 and 508, whereas the charge adjustment apparatus 700 illustrated in FIG. 7 includes a bias application roller 704, a bias application counter roller 705, and an application bias control unit 707. In other words, the ionizers 507 and 508 are not included.

Figure 8:
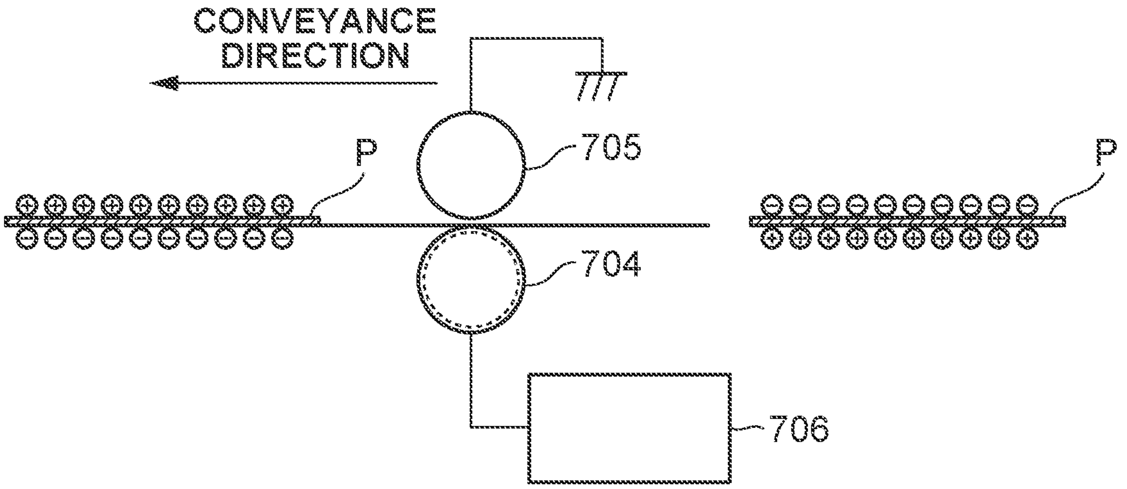
FIG. 8 is a cross-sectional view of a charge adjustment unit according to the fourth exemplary embodiment.
Figure 9:
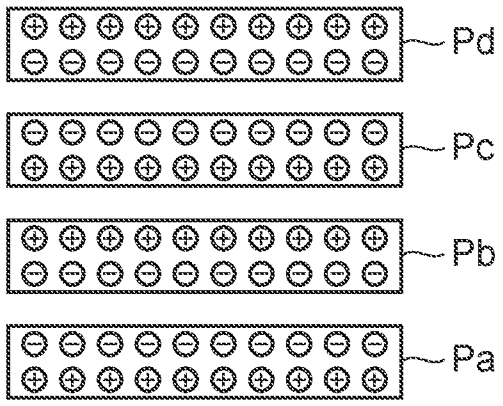
FIG. 9 illustrates a state where sheets are stacked according to the fourth exemplary embodiment.

FIG. 8 is a cross-sectional view illustrating a configuration of the charge adjustment apparatus 700 of the image forming system illustrated in FIG. 7. The charge adjustment apparatus 700 includes the bias application roller 704 and the bias application counter roller 705 to come into contact with the sheet P. The bias application roller 704 and the bias application counter roller 705 constitute a bias application roller pair 700*a* as a charge adjustment unit that adjusts a charge on a sheet while being in contact with the sheet. The bias application counter roller 705 is electrically grounded (connected to ground). The bias application roller 704 includes a charge adjustment power supply 706. Charge adjustment of the sheet P will be described with the lower surface of the sheet P being positively charged by voltage application in the secondary transfer. When images are successively formed on a plurality of sheets, the application bias control unit 707 controls the charge adjustment power supply 706 to apply a minus voltage to the bias application roller 704 for every other sheet so as to charge a sheet surface of every other sheet with the reversely charged polarity. In other words, the bias application roller pair 700*a* gives a charge of the polarity opposite to the polarity of the surface potential of the sheet on which an image is formed, to the sheet. As a result, the surface potential of the sheet before the sheet passes through the bias application roller pair 700*a* and the surface potential of the sheet after the sheet passes through the bias application roller pair 700*a* are reversed. In other words, the charge adjustment unit performs charge adjustment processing for giving a charge to every other sheet so as to reverse the surface potential of the sheet on which an image is formed. FIG. 9 illustrates a state where sheets are stacked according to the present exemplary embodiment. A case will be described where the bias application roller pair 700*a* gives charges to even-numbered sheets P. When first to fourth sheets are denoted by Pa to Pd, the sheets Pa and Pc to which no charges are given by the charge adjustment apparatus 700 are stacked in a state where the upper surfaces are negatively charged, and the lower surfaces are positively charged. The sheets Pb and Pd charged by the charge adjustment apparatus 700 such that the charged polarity of the sheet surface is reversed are stacked in a state where the upper surfaces are positively charged, and the lower surfaces are negatively charged. As described above, sheets are charged such that facing surfaces repel each other with the sheets stacked. This makes it possible to prevent adhesion of the sheets caused by an electrostatic force. However, the arrangement of the bias application roller 704 and the bias application counter roller 705 is not limited thereto. The bias application counter roller 705 electrically grounded (connected to ground) may be disposed facing the lower surface of sheets, and the bias application roller 704 may be disposed facing the upper surface of sheets. In other words, if the lower surface of the sheet P is positively charged by voltage application in the secondary transfer, the upper surface of the sheet P is negatively charged. Thus, the bias application roller 704 may give a positive charge to the sheet P to the upper surface of the sheet P.

The insertion sheet P1 fed from the feeding tray 303 of the inserter 300 is often conveyed to the charge adjustment apparatus 700 while being not charged. When charge adjustment processing similar to the charge adjustment processing on the sheet P on which an image is formed by the image forming apparatus 100 is performed on the insertion sheet P1, the insertion sheet P1 can be excessively charged. More specifically, if the bias application roller pair 700*a* gives charges to the even-numbered sheets, when the insertion sheet P1 is conveyed to the charge adjustment apparatus 700 at an even number and a charge is given to the insertion sheet P1 by the bias application roller pair 700*a*, the insertion sheet P1 is excessively charged. As a result, the surface of the insertion sheet P1 and the surface of the sheet facing the insertion sheet P1 when the sheets are stacked excessively repel each other, which can cause a stacking failure. Thus, in the charge adjustment apparatus 700, the bias application roller pair 700*a* performs the charge adjustment processing on the sheet P on which an image is formed by the image forming apparatus 100, but does not perform on the insertion sheet P1. In other words, in the charge adjustment apparatus 700, the bias application roller pair 700*a* performs the charge adjustment processing on the sheet P discharged from the image forming apparatus 100 and conveyed to the charge adjustment apparatus 700 through the through path 301. In contrast, in the charge adjustment apparatus 700, the bias application roller pair 700*a* does not perform the charge adjustment processing on the insertion sheet P1 fed from the feeding tray 303 of the inserter 300 and conveyed to the charge adjustment apparatus 700 through the insertion conveyance path 305. In other words, the bias application roller pair 700*a* gives a charge to every other sheet P on which an image is formed, and gives no charge to all insertion sheets P1 conveyed from the inserter 300. This makes it possible to prevent a sheet stacking failure in the fourth exemplary embodiment, as in the above-described other exemplary embodiments.

According to the exemplary embodiments, even if the insertion sheet is fed from the insertion apparatus, stacking property of the discharged sheets can be improved.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described Embodiments, and by a method performed by the computer of the system or apparatus by, for example, reading out and executing the computer executable instructions from the storage medium to perform the functions of one or more of the above-described Embodiments and/or controlling the one or more circuits to perform the functions of one or more of the above-described Embodiments. The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2023-025655, filed Feb. 22, 2023, and No. 2023-209664, filed Dec. 12, 2023, which are hereby incorporated by reference herein in their entirety.

What is claimed is:

1. An image forming system comprising:

an image forming apparatus configured to form an image on a sheet;

an insertion apparatus disposed downstream of the image forming apparatus, and configured to insert an insertion sheet among a plurality of sheets on each of which an image is formed by the image forming apparatus; and a charge eliminating apparatus disposed downstream of the insertion apparatus, and including a charge eliminating unit configured to perform charge elimination on the sheet on which the image is formed by the image forming apparatus, wherein the insertion apparatus includes a first conveyance path through which the sheet discharged from the image forming apparatus is conveyed to the charge eliminating apparatus, a feeding tray on which the insertion sheet is stacked, and a second conveyance path through which the insertion sheet fed from the feeding tray is conveyed to the charge eliminating apparatus, and wherein, in the charge eliminating apparatus, the charge eliminating unit performs charge elimination processing on the sheet discharged from the image forming apparatus and conveyed to the charge eliminating apparatus through the first conveyance path, but does not perform the charge elimination processing on the insertion sheet fed from the feeding tray and conveyed to the charge eliminating apparatus through the second conveyance path.

2. The image forming system according to claim 1, wherein, in the charge eliminating apparatus, the charge eliminating unit does not perform the charge elimination processing on the insertion sheet fed from the feeding tray and conveyed to the charge eliminating apparatus through the second conveyance path, irrespective of a type of the insertion sheet, and wherein, in a case where the sheet discharged from the image forming apparatus and conveyed to the charge eliminating apparatus through the first conveyance path is of a first type, in the charge eliminating apparatus, the charge eliminating unit performs the charge elimination processing and in a case where the sheet is of a second type, the charge eliminating unit does not perform the charge elimination processing.

3. The image forming system according to claim 1, wherein the charge eliminating unit is a charge eliminating roller pair configured to perform charge elimination on the sheet while being in contact with the sheet, and wherein the charge eliminating apparatus includes the charge eliminating roller pair, and a non-contact charge eliminating unit disposed downstream of the charge eliminating roller pair and configured to perform charge elimination on the sheet while being not in contact with the sheet.

4. The image forming system according to claim 3, wherein the charge eliminating apparatus causes the non-contact charge eliminating unit to perform charge elimination on the insertion sheet not subjected to the charge elimination processing by the charge eliminating roller pair.

5. An image forming system comprising:

an image forming apparatus configured to form an image on a sheet;

an insertion apparatus disposed downstream of the image forming apparatus, and configured to insert an insertion sheet among a plurality of sheets on each of which an image is formed by the image forming apparatus; and a charge eliminating apparatus disposed downstream of the insertion apparatus, and including a charge eliminating unit configured to perform charge elimination on the sheet on which the image is formed by the image forming apparatus, wherein the insertion apparatus includes a first conveyance path through which the sheet discharged from the image forming apparatus is conveyed to the charge eliminating apparatus, a feeding tray on which the insertion sheet is stacked, and a second conveyance path through which the insertion sheet fed from the feeding tray is conveyed to the charge eliminating apparatus, and wherein the charge eliminating apparatus is configured to perform a first mode in which charge elimination processing by the charge eliminating unit is performed on the sheet discharged from the image forming apparatus and conveyed to the charge eliminating apparatus through the first conveyance path but the charge elimination processing by the charge eliminating unit is not performed on the insertion sheet fed from the feeding tray and conveyed to the charge eliminating apparatus through the second conveyance path, and a second mode in which the charge elimination processing by the charge eliminating unit is performed on both the sheet discharged from the image forming apparatus and conveyed to the charge eliminating apparatus through the first conveyance path and the insertion sheet fed from the feeding tray and conveyed to the charge eliminating apparatus through the second conveyance path.

6. The image forming system according to claim 5, further comprising an acquisition unit configured to acquire a type of the sheet stacked on the feeding tray, wherein the charge eliminating apparatus selectively performs the first mode or the second mode based on the type of the sheet acquired by the acquisition unit.

7. An image forming system comprising:

an image forming apparatus configured to form an image on a sheet;

an insertion apparatus disposed downstream of the image forming apparatus, and configured to insert an insertion sheet among a plurality of sheets on each of which an image is formed by the image forming apparatus; and a charge eliminating apparatus disposed downstream of the insertion apparatus, and including a charge eliminating unit configured to perform charge elimination on the sheet on which the image is formed by the image forming apparatus, wherein the insertion apparatus includes a first conveyance path through which the sheet discharged from the image forming apparatus is conveyed to the charge eliminating apparatus, a feeding tray on which the insertion sheet is stacked, and a second conveyance path through which the insertion sheet fed from the feeding tray is conveyed to the charge eliminating apparatus, and wherein, in the charge eliminating apparatus, the charge eliminating unit performs charge elimination processing on the sheet discharged from the image forming apparatus and conveyed to the charge eliminating apparatus through the first conveyance path, at a first voltage, and performs the charge elimination processing on the insertion sheet fed from the feeding tray and conveyed to the charge eliminating apparatus through the second conveyance path at a second voltage lower than the first voltage.

8. An image forming system comprising:

an image forming apparatus configured to form an image on a sheet;

an insertion apparatus disposed downstream of the image forming apparatus, and configured to insert an insertion sheet among a plurality of sheets on each of which an image is formed by the image forming apparatus; and a charge adjustment apparatus disposed downstream of the insertion apparatus, and including a charge adjustment unit configured to perform charge adjustment processing for giving a charge to every other sheet on which the image is formed by the image forming apparatus, to reverse a surface potential of the sheet on which the image is formed, wherein the insertion apparatus includes a first conveyance path through which the sheet discharged from the image forming apparatus is conveyed to the charge adjustment apparatus, a feeding tray on which the insertion sheet is stacked, and a second conveyance path through which the insertion sheet fed from the feeding tray is conveyed to the charge adjustment apparatus, and wherein, in the charge adjustment apparatus, the charge adjustment unit performs charge adjustment processing on the sheet discharged from the image forming apparatus and conveyed to the charge adjustment apparatus through the first conveyance path, but does not perform the charge adjustment processing on the insertion sheet fed from the feeding tray and conveyed to the charge adjustment apparatus through the second conveyance path.

9. A charge eliminating apparatus configured to be connected to an image forming apparatus configured to form an image on a sheet and to an insertion apparatus configured to insert an insertion sheet among a plurality of sheets, the charge eliminating apparatus comprising:

a charge eliminating unit configured to perform charge elimination on the sheet on which the image is formed by the image forming apparatus, wherein the charge eliminating unit performs charge elimination processing on the sheet on which the image is formed by the image forming apparatus, but does not perform the charge elimination processing on the insertion sheet conveyed from the insertion apparatus.

* * * * *